(12) United States Patent
Alexander et al.

(10) Patent No.: US 6,991,181 B2
(45) Date of Patent: Jan. 31, 2006

(54) SOAKER/SPRINKLER HOSE

(75) Inventors: Gus Alexander, Inverness, IL (US); John Pianetto, Hoffman Estates, IL (US); Morgan P. McCarthy, Schaumburg, IL (US)

(73) Assignee: Faip North America, Inc., Elk Grove Village, IL (US)

( * ) Notice: Subject to any disclaimer, the term of this patent is extended or adjusted under 35 U.S.C. 154(b) by 0 days.

(21) Appl. No.: 10/224,789

(22) Filed: Aug. 21, 2002

(65) Prior Publication Data

US 2004/0046045 A1 Mar. 11, 2004

(51) Int. Cl.
*A01G 25/06* (2006.01)
*B05B 15/06* (2006.01)
*B05B 15/00* (2006.01)

(52) U.S. Cl. ............... 239/201; 239/200; 239/207; 239/542; 239/546; 239/547; 239/548; 239/556

(58) Field of Classification Search ........... 239/200, 239/201, 207, 542, 547, 546, 548, 554, 556, 239/553.3, 266, 269, 195; 138/109, 114, 138/115, 118, 119
See application file for complete search history.

(56) References Cited

U.S. PATENT DOCUMENTS

| | | | | |
|---|---|---|---|---|
| 2,314,525 A | * | 3/1943 | Summers | 239/557 |
| 2,730,404 A | * | 1/1956 | Meisinger et al. | 239/269 |
| 2,747,935 A | * | 5/1956 | Szantay | 138/89 |
| 3,459,377 A | * | 8/1969 | Van Der Hulse | 239/394 |
| 3,727,845 A | * | 4/1973 | Bohlman | 239/533.13 |
| 3,998,392 A | * | 12/1976 | St. Clair | 239/547 |
| 4,161,290 A | * | 7/1979 | Hill | 239/396 |
| 4,454,989 A | * | 6/1984 | Alston | 239/269 |
| 4,756,339 A | * | 7/1988 | Buluschek | 138/115 |
| 5,474,398 A | | 12/1995 | Prassas et al. | |
| 5,480,336 A | * | 1/1996 | Blanchard | 446/89 |
| 5,964,409 A | | 10/1999 | Alexander et al. | |
| 6,023,883 A | * | 2/2000 | Bacon, Jr. | 47/48.5 |
| 6,260,769 B1 | | 7/2001 | Hoover | |

* cited by examiner

*Primary Examiner*—Davis Hwu
(74) *Attorney, Agent, or Firm*—Leydig, Voit & Mayer, Ltd.

(57) ABSTRACT

A soaker/sprinkler hose having a cylindrical cross section with radial discharge orifices circumferentially spaced about the entire perimeter of the conduit along the length thereof for simultaneously directing liquid flow streams downwardly into the ground on one side of the conduit for soaking the ground and upwardly into the air for watering the ground in sprinkling fashion. The hose is formed with a plurality of axially aligned rows of discharge orifices, at circumferentially spaced intervals about the conduit, and is cured in a retractable coiled condition which facilitates random direction of the discharging liquid streams when the hose is extended and which facilitates handling and storage of the hose. A method of making the coiled soaker/sprinkler hose also is disclosed.

10 Claims, 2 Drawing Sheets

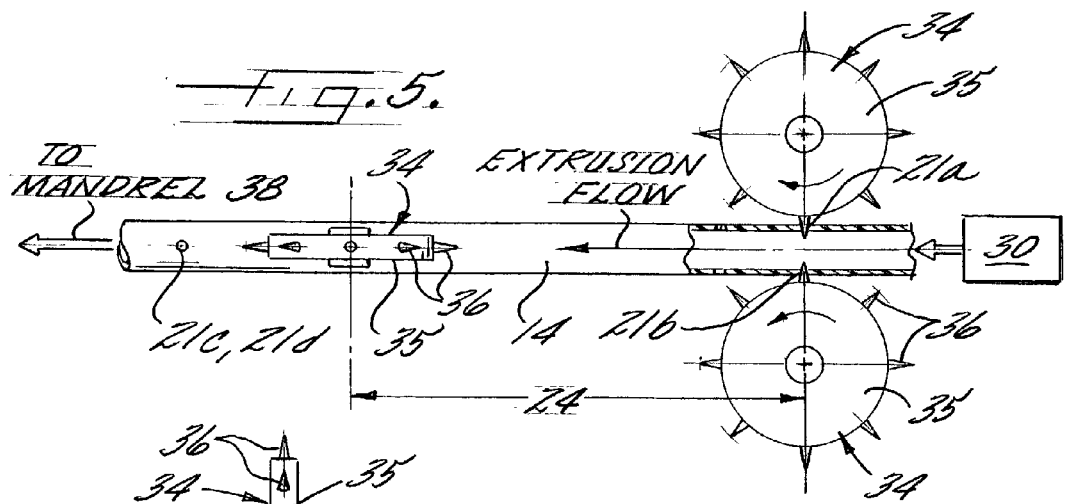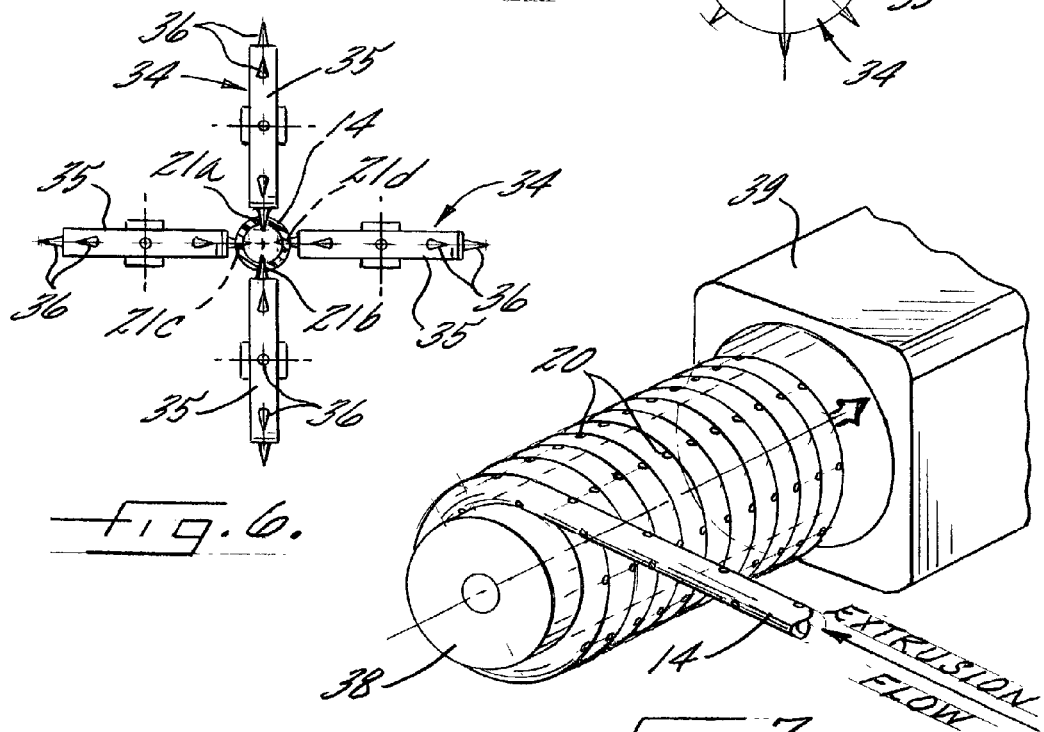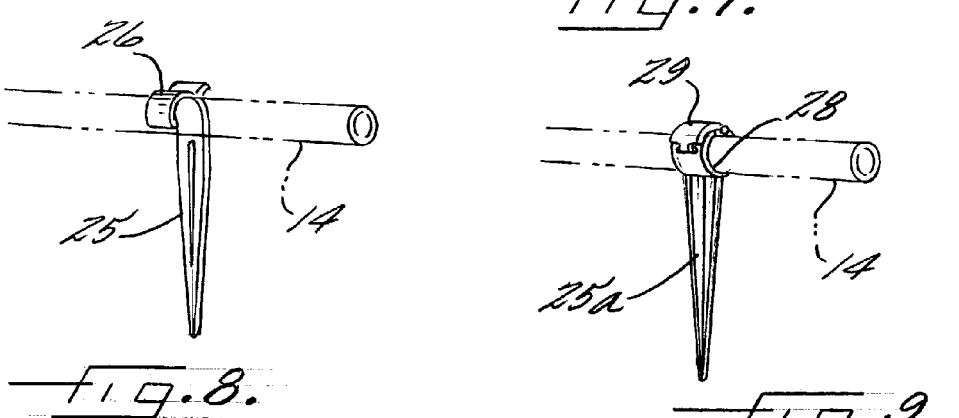

(SOAKER/SPRINKLER HOSE)

SOAKER/SPRINKLER HOSE

FIELD OF THE INVENTION

The present invention relates generally to watering and irrigation hoses, and more particularly, to soaker and sprinkling hoses.

BACKGROUND OF THE INVENTION

Soaker hoses are known which are made of a pervious or porous material that allows water to seep through the wall of the hose to thoroughly wet a relatively narrow width length of ground immediately beneath the hose. Soaker/sprinkler hoses also are known which have a plurality of distinct apertures in one side of the hose at axially spaced locations along the length of the hose to permit water to be sprayed from such locations. When the hose is laid along the ground with the apertures facing downwardly, the hose serves as a typical soaker hose, thoroughly wetting the portion of the ground immediately below the hose. When the hose is oriented with the axially spaced apertures directed upwardly, the hose directs streams of water upwardly for watering a wider width length of the ground in sprinkling fashion.

Soaker/sprinkler hoses of the foregoing type, which typically have either a flat rectangular cross section or a cylindrical configuration, are well known for the their difficulty in usage. Flat soaker/sprinkler hoses are cumbersome to effectively use since the hose must be laid flatly along the ground. Not only is it difficult to orient a long length of such soaker/sprinkler hose flatly along the ground, particularly if it has an uneven contour, it is impossible to turn corners or to reverse the direction of a hose without significantly disrupting the orientation of the hose and the intended spray discharge. Cylindrical soaker/sprinkler hoses are even more cumbersome to use since they do not have a flat surface to facilitate positioning of the hose on the ground and orienting the spray discharge apertures. A tedious procedure must be employed to orient the axially aligned discharge orifices of a cylindrical hose along its entire length for the desired direction of the discharging liquid.

OBJECTS AND SUMMARY OF THE INVENTION

It is an object of the present invention to provide a soaker/sprinkler hose which is adapted for easier and more flexible usage in landscape irrigating and watering.

Another object is to provide a soaker/sprinkler hose as characterized above which may be used without cumbersome and tedious orientation of the spray discharge orifices therein.

A further object is to provide a soaker/sprinkler of the above kind which can be simultaneously used for both soaking and sprinkling.

Still another object is to provide a soaker/sprinkler hose of the foregoing type that can be easily positioned around corners of garden areas and sidewalks without disrupting the function of the hose at such locations.

Yet a further object is to provide a soaker/sprinkler hose which has a coil configuration that enhances the random direction of the liquid sprinkling pattern.

Another object is to provide a coil configured soaker/sprinkler hose that is automatically retractable for easy handling, usage, and storage.

Still another object is to provide a soaker/sprinkler hose of the foregoing type that is relatively simple in construction and which lends itself to economical manufacture. A related object is to provide an efficient method of making such a soaker/sprinkler hose.

Other objects and advantages of the invention will become apparent upon reading the following detailed description and upon reference to the drawings, in which:

BRIEF DESCRIPTION OF THE DRAWINGS

FIG. 5 is a schematic of the method steps of extruding the hose conduit and forming the conduit with liquid discharge orifices;

FIG. 6 is a transverse section through the extruded hose conduit depicting the arrangement of the orifice forming pinwheels shown in FIG. 5;

FIG. 7 is a schematic showing the extruded hose conduit being wound upon a mandrel for transport into a heating and curing chamber;

FIG. 8 is a perspective of one form of retaining stake for securing the hose in position during usage; and FIG. 9 is a perspective of another form of hose retaining stake.

Figure 1:
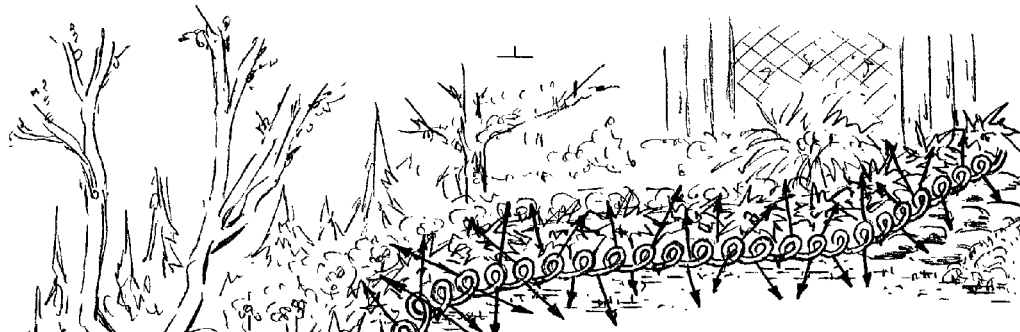
FIG. 1 is a perspective of a soaker/sprinkler hose in accordance with the invention being used about the contoured perimeter of a garden or landscaped area.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

Referring now more particularly to the drawings, there is shown an illustrative soaker/sprinkler hose 10 in accordance with the invention shown for use in soaking and sprinkling a narrow width area along the perimeter 11 of a garden or landscape area 12. The hose 10 is in the form of a cylindrical conduit 14 having a circular cross section with a conventional female inlet fitting 15 at one end for connection to a liquid supply outlet or hose and a male downstream fitting 18 which, in this case, has a threaded end cap 19 thereon for closing the end of the hose. It will be appreciated that the end cap 19 may be removed from the downstream end fitting 18 for permitting the downstream end of the hose to be coupled to a similar soaker/sprinkler hose for longer watering requirements. The hose 10 preferably is made of polyurethane and has a wall thickness of about 0.26 mm. for defining an internal liquid flow passageway of between about ¼ and 1 inch diameter suitable for most residential needs. The perimeter 11 of the illustrated landscape area 12, typical of flower gardens and the like, is curved or contoured to enhance its appearance. As indicated above, it has been cumbersome to use conventional soaker/sprinkler hoses about such curved areas without tedious positioning and repositioning of the hose such that the discharge orifices are properly oriented either downwardly or upwardly.

In accordance with one aspect of the invention, the hose is adapted for easier and more versatile simultaneous usage as both (1) a soaker hose for directing liquid downwardly into the ground in the vicinity immediately below the hose for thoroughly soaking that area of the ground and (2) as a sprinkler hose for discharging discrete upwardly and outwardly directed streams of liquid particles over a larger width area of the ground in a sprinkling fashion. To this end, the hose 10, along substantially its entire length, is formed with a plurality of discrete, circumferentially spaced liquid discharge orifices 20 about the entire perimeter of the cylindrical conduit 14 sized to permit, under typical residential water pressures, the discharge of streams of water in a plurality of radial directions above and below the hose.

The discharge orifices 20 in this case are radially oriented and substantially cylindrical in form, having a diameter of between about 0.1 and 0.2 mm. such that with inlet water pressures of between about 15–100 psi the discharge orifices 20 are effective for directing liquid streams between about three to six foot upwardly and outwardly of the hose. It will be understood by one skilled in the art that the size of the liquid droplets directed into the air is a function of the water pressure and the orifice diameter. Hence, depending upon the particular desired application, the orifices can direct liquid droplets of a size for effectively sprinkling the area on opposite sides of the hose. Smaller sized discharge orifices, and particularly at higher liquid pressure, will direct smaller sized liquid particles that are effective for creating a mist in the surrounding area. For purposes herein, the term "soaker/sprinkler hose" is intended to encompass hoses which direct upward and outward liquid particle streams for either sprinkling or misting applications.

The liquid discharge orifices 20 in this case comprise groups 21a, 21b, 21c, 21d etc. of circumferentially spaced apertures 20 at uniformly spaced axial locations 24 (FIG. 5) along the length of the hose. More particularly, in the illustrated embodiment, each group 21a–21d, etc. of the radial discharge orifices 20 comprises four 90°, circumferentially spaced passages at each axial location. The groups 21a–21d, etc. of discharge orifices 20 in this case are uniformly spaced apart, such as at four-inch intervals from each other along substantially the entire length of the hose. It will be understood by one skilled in the art that while the illustrated hose has four radial passages 21 at each axial location, alternatively, greater numbers of radial passages could be used. Still as a further alternative, other patterns of radial discharge orifices could be used, including spiral patterns, in which the orifices are located at random circumferential and axially spaced locations with respect to each other.

It will be appreciated by one skilled in the art that the soaker/sprinkler hose 10 of the present invention is adapted for more effective, more versatile, and substantially easier usage than prior soaker/sprinkler hoses. Indeed, the hose 10 may be laid out along the desired soaking and sprinkling course, without concern with respect to the orientation of the discharge apertures 20. In any rotated or twisted position of the hose, the discharging liquid streams will be directed both downwardly into or toward the ground for soaking application and upwardly into the air for sprinkling/misting application. Hence, the hose can be easily laid out along the desired sprinkling course, including courses in which the hose curves about a contoured landscape area or walkway, or even completely reverses direction.

Figures 2, 4:
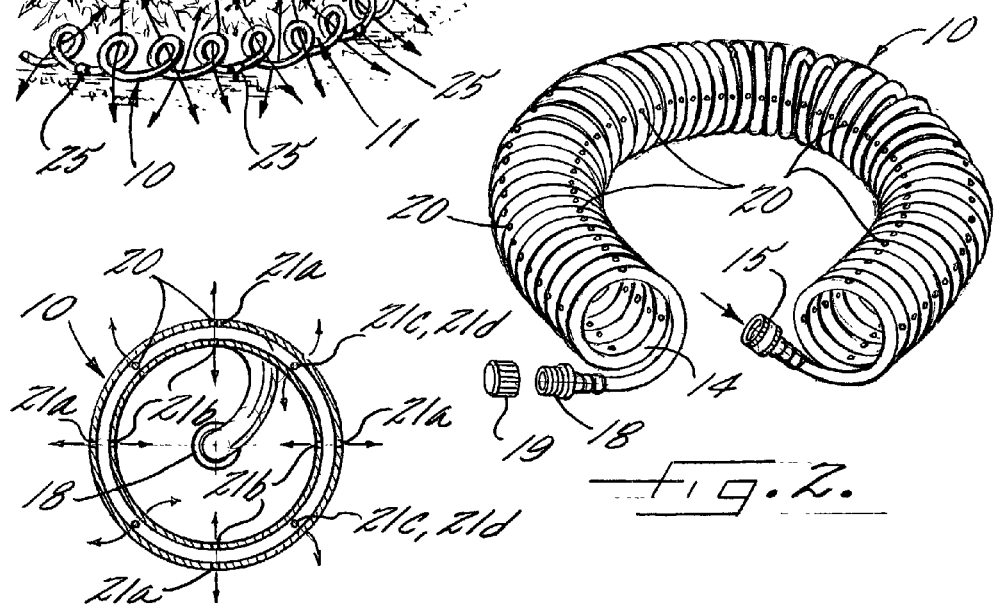
FIG. 2 is a perspective of the soaker/sprinkler hose shown in FIG. 1 in a retracted stored position.
FIG. 4 is a vertical section of the soaker/sprinkler hose shown in FIG. 3, taken in the plane of line 4—4.
Figure 3:
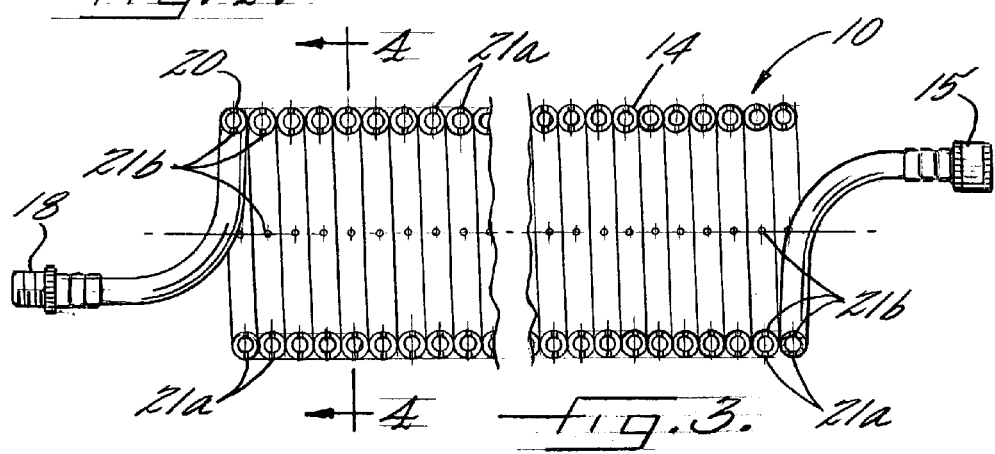
FIG. 3 is a longitudinal section of the illustrated soaker/sprinkler hose in its retracted condition.

In accordance with a further aspect of the invention, the hose has a retractable coil construction which facilitates handling and storage of the hose and which further facilitates random direction of the discharging radial liquid streams. To this end, as shown in FIG. 2, the hose 10 has a coiled construction which when in a released or stored condition comprises a plurality of closely positioned helical coils having a diameter of about 6 inches. A 50-foot section of the hose, for example, retracts to about 18 inches in length. To use the hose, the inlet end 15 is fixed to an inlet supply line or pipe (not shown), and if necessary secured to the ground by a suitable retaining stake 25. The hose can then be manually trained outwardly from the coil along the desired course. For making turns, further retaining stakes 25 may be used at suitable spaced locations. The hose 10 preferably is pulled to a substantially straight condition, although even in that condition, the hose makes slight helical turns, which randomly offsets the radial orifices 20 of each group 21a–21d, etc. at slightly different circumferential orientations along the length of the hose for enhanced random direction.

The retaining stakes 25 may be in the form of a plastic molded part, such as shown in FIG. 8, which has a pointed end for easy insertion into the ground and a retaining arm 26 for positioning over the hose and holding it closely against the ground at the desired location. Alternatively, the retaining stake 25a may have a pivotal hose-retaining arm, such as shown in FIG. 9. In this instance, the upper end of the stake is formed with a curved hose-receiving seat 28 and has a separate retaining arm 29 is pivotally connected at one side thereof for positioning over the hose and releasably latching at a location adjacent an opposite side of the seat 29.

In keeping with the invention, an efficient and economical method is provided for making the subject soaker/sprinkler hose. As schematically depicted in FIG. 5, a tubular conduit 14 of polyurethane material first is extruded from an extruding machine 30 with the desired internal diameter, preferably between about ¼ and 1 inch, and the desired wall thickness. It will be understood that such an extruding machine 30 and its method of operation are well known in the art.

In carrying out the method invention, radial liquid discharge orifices are formed circumferentially about the perimeter of the conduit as the conduit is being extruded from the extruding machine. In the illustrated embodiment, four straight rows of axially spaced apertures are formed at 90° circumferential spaced locations about the conduit as the conduit is being extruded. To that end, a plurality of pin wheels 34 are disposed at circumferentially spaced locations about the conduit immediately downstream of the extruding machine which are operable for forming respective rows of axially spaced apertures 21 circumferentially spaced along the length of the extruded conduit 14.

For forming the apertures, in the illustrated embodiment as shown in FIGS. 5 and 6, two pairs of pinwheels are provided about the extruded conduit in perpendicular planes to each other such that each pinwheel is in a radial plane extending through the center of the conduit. Each pinwheel has a cylindrical hub 35 located in closely spaced relation to the outer perimeter of the extruded conduit 14 and a plurality of circumferentially spaced radial pins 36 about the perimeter of the hub 35. It will be understood by one skilled in the art that the circumferential spacing of the pins can be designed to coincide with the desired axial spacing of the orifices 20. Hence, as the conduit 14 is extruded and passes between the pinwheels 34, which may be driven at a corresponding speed, the pins 36 will successively pierce and form rows of apertures, having a diameter corresponding to the size of the pins. While the pins in this case have a V-shaped cross section, the resulting aperture is substantially cylindrical in form. Other forms of pins, of course, may be used.

Following passage of the pinwheels 34, the extruded conduit is directed onto a cylindrical mandrel 38 having a diameter corresponding to the intended internal diameter of the coil into which the conduit 14 is to be formed. The conduit is helically wound about the mandrel 38, as depicted in FIG. 7, and the mandrel is thereupon transferred by appropriate means, such as by axial movement, into a heating chamber 39, where the conduit is heated to a temperature, as is known in the art, sufficient to permanently cure the polyurethane material into its coiled form. Following such curing, the end fittings are applied to the conduit to complete the hose, which in an untensioned condition, assumes a retracted coil as shown in FIG. 2. As described above, the coiled hose may be easily stored and handled in such retracted position, while being manually stretched into a substantially straight condition for usage.

From the foregoing, it can be seen that a soaker/sprinkler hose is provided which is adapted for easier and more flexible usage in landscape irrigating and watering, without cumbersome and tedious orientation of the discharge spray orifices therein. The soaker/sprinkler hose can be simultaneously used for soaking and sprinkling and can be easily positioned around the corners of garden areas and sidewalks without disrupting the function of the hose at such locations. The permanent coil configuration of the hose further enhances random direction of the sprinkling pattern and facilitates easy handling, usage and storage.

What is claimed is:

1. A soaker/sprinkler hose comprising:
   an elongated cylindrical conduit positionable in desired fashion along the ground,
   an inlet fitting at an upstream end of said conduit for connection with a liquid supply,
   a downstream fitting at a downstream end of said conduit,
   said elongated cylindrical conduit having a circular cross section with a cylindrical wall which defines a central liquid flow passage for communicating liquid from said inlet fitting longitudinally along the length of said elongated conduit, said cylindrical wall having an outer cylindrical surface that is positionable on the ground at any location about its perimeter,
   said cylindrical conduit wall being formed with a plurality of radial discharge orifices extending radially straight through the cylindrical wall of said elongated conduit to said central liquid flow passage, said radial discharge orifices being spaced at different circumferentially spaced locations about the perimeter of the conduit along the length thereof for simultaneously directing liquid communicated along the length of said elongated conduit in radial discharging liquid flow streams downwardly into the ground on one circumferential side of the cylindrical conduit for soaking the ground and upwardly into the air from all other circumferential sides of the cylindrical conduit for watering the ground in sprinkling fashion.

2. The soaker/sprinkler hose of claim 1 in which said discharge orifices each are defined by a substantially cylindrical configured liquid flow passage.

3. The soaker/sprinkler hose of claim 2 in which said cylindrical flow passages have a diameter of between about 0.1 and 0.2 mm.

4. The soaker/sprinkler hose of claim 1 in which said discharge orifices comprise groups of discharge orifices located at axially spaced intervals along the length of the cylindrical conduit.

5. The soaker/sprinkler hose of claim 4 in which said discharge orifices of each group are disposed with uniform circumferential spacing about the cylindrical conduit.

6. The soaker/sprinkler hose of claim 4 in which each said group of discharge orifices comprise at least four discharge orifices.

7. The soaker/sprinkler hose of claim 5 in which said orifices of each group are circumferentially spaced 90° with respect to each other.

8. The soaker/sprinkler hose of claim 1 in which said hose has a retractable coiled configuration and is extendable between a retracted coiled conditions and a substantially straight condition.

9. The soaker/sprinkler hose of claim 8 in which said discharge orifices comprise groups of discharge orifices located at axially spaced intervals along the length of the cylindrical conduit, said groups of said discharge orifices at some axial locations being angularly offset from the groups of said discharge orifices at other axial locations when said hose is in said substantially straight condition.

10. The soaker/sprinkler hose of claim 1 in which said discharge orifices are disposed in at least four circumferentially spaced locations about the cylindrical conduit for directing flow streams in at least four radial directions with respect to a center of the cylindrical conduit.

\* \* \* \* \*